(12) United States Patent
Sutterfield et al.

(10) Patent No.: US 11,408,368 B2
(45) Date of Patent: Aug. 9, 2022

(54) RECONFIGURABLE EXHAUST NOZZLE FOR A GAS TURBINE ENGINE

(71) Applicants: Rolls-Royce North American Technologies Inc., Indianapolis, IN (US); Rolls-Royce Corporation, Indianapolis, IN (US)

(72) Inventors: David L. Sutterfield, Greenwood, IN (US); Todd S. Taylor, Bargersville, IN (US); Jack D. Petty, Indianapolis, IN (US); Andrew Sanderson, Indianapolis, IN (US); Bryan H. Lerg, Carmel, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 1 day.

(21) Appl. No.: 16/836,080

(22) Filed: Mar. 31, 2020

(65) Prior Publication Data
US 2021/0301760 A1    Sep. 30, 2021

(51) Int. Cl.
| F02K 1/08 | (2006.01) |
| F02K 1/34 | (2006.01) |
| F02K 1/70 | (2006.01) |
| F02K 1/04 | (2006.01) |
| F02K 1/62 | (2006.01) |
| F02K 1/76 | (2006.01) |

(52) U.S. Cl.
CPC .................. F02K 1/34 (2013.01); F02K 1/04 (2013.01); F02K 1/08 (2013.01); F02K 1/62 (2013.01); F02K 1/70 (2013.01); F02K 1/763 (2013.01); F05D 2260/96 (2013.01)

(58) Field of Classification Search
CPC ... F02K 1/06; F02K 1/08; F02K 1/085; F02K 1/60; F02K 1/70
See application file for complete search history.

(56) References Cited

U.S. PATENT DOCUMENTS

| 3,108,767 | A | * | 10/1963 | Eltis | F02K 1/08 |
| | | | | | 244/203 |
| 3,347,466 | A | * | 10/1967 | Nichols | F02K 1/62 |
| | | | | | 239/265.19 |
| 3,568,930 | A | * | 3/1971 | Kuchar | F02K 1/62 |
| | | | | | 239/265.19 |
| 3,612,402 | A | * | 10/1971 | Timms | B64C 9/38 |
| | | | | | 239/265.29 |
| 3,829,020 | A | | 8/1974 | Stearns | |
| 3,908,683 | A | * | 9/1975 | Demetrick | F02C 7/045 |
| | | | | | 137/15.1 |
| 4,043,508 | A | | 8/1977 | Speir et al. | |

(Continued)

FOREIGN PATENT DOCUMENTS

GB    1362106 A * 7/1974 ............... F02K 1/08

*Primary Examiner* — Todd E Manahan
*Assistant Examiner* — Marc J Amar
(74) *Attorney, Agent, or Firm* — Barnes & Thornburg LLP

(57) ABSTRACT

A propulsion unit includes a gas turbine engine arranged along an axis and an exhaust system coupled to the gas turbine engine. The gas turbine engine includes an engine core configured to discharge a core flow and a fan configured to be driven by the engine core to discharge a bypass flow. The exhaust system receives the mixed bypass and core flows from the gas turbine engine.

17 Claims, 5 Drawing Sheets

(56) References Cited

U.S. PATENT DOCUMENTS

| | | | |
|---|---|---|---|
| 4,295,611 A | | 10/1981 | Wynosky et al. |
| 4,462,207 A | * | 7/1984 | Hitchcock ................. F02K 1/60 239/265.31 |
| 4,527,388 A | | 7/1985 | Wallace, Jr. |
| 4,592,508 A | * | 6/1986 | Thornock ................. F02K 1/08 239/265.19 |
| 4,802,629 A | * | 2/1989 | Klees ....................... F02K 1/625 239/265.19 |
| 4,909,346 A | * | 3/1990 | Torkelson ................. F02K 1/08 239/265.17 |
| 5,038,559 A | * | 8/1991 | Blackmore ............... F02K 1/08 60/204 |
| 5,908,159 A | * | 6/1999 | Rudolph ................... F02K 1/383 239/265.17 |
| 7,174,704 B2 | | 2/2007 | Renggli |
| 7,178,338 B2 | | 2/2007 | Whurr |
| 7,886,518 B2 | | 2/2011 | Moniz et al. |
| 8,015,797 B2 | | 9/2011 | Lair |
| 8,091,827 B2 | | 1/2012 | Lair |
| 8,833,053 B2 | * | 9/2014 | Chir ........................ F02K 1/763 60/785 |
| 9,181,899 B2 | | 11/2015 | Dindar et al. |
| 10,400,621 B2 | | 9/2019 | Sawyers-Abbott et al. |
| 2004/0006969 A1 | * | 1/2004 | Whurr ....................... F02K 1/08 60/262 |
| 2007/0125065 A1 | * | 6/2007 | Renggli .................... F02K 3/04 60/204 |
| 2010/0095650 A1 | | 4/2010 | Schafer |
| 2012/0192543 A1 | | 8/2012 | Aeberli et al. |
| 2021/0291964 A1 | * | 9/2021 | Gilbert .................... B64C 25/24 |

* cited by examiner

RECONFIGURABLE EXHAUST NOZZLE FOR A GAS TURBINE ENGINE

FIELD OF THE DISCLOSURE

The present disclosure relates generally to gas turbine engines, and more specifically to exhaust nozzles for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Exhaust nozzles can have size and shape to optimize engine operation. A larger exhaust nozzle area can reduce velocity of the exhaust air and lower noise emissions of the engine. The shape of the exhaust nozzle can optimize the exhaust flow exiting the engine to increase engine efficiency and improve thrust. In some applications, the exhaust nozzle mixes the hot exhaust air from the turbine with cooler by-pass duct air.

Subsonic exhaust nozzles typically have a convergent shape, which causes expansion of the gases to atmospheric pressure downstream of the exhaust nozzle when choked. This creates some thrust from the imbalance of the static pressure at the throat of the exhaust and the atmospheric pressure. Supersonic exhausts may have a convergent-divergent shape to generate supersonic flow of the exhaust gases. The convergent section of the exhaust nozzle may be sized to choke the flow so that the flow is sonic at the throat. The divergent section of the exhaust nozzle may allow further expansion of the gases inside the nozzle and accelerates the flow to supersonic.

SUMMARY

The present disclosure may comprise one or more of the following features and combinations thereof.

A propulsion unit for an aircraft may include a gas turbine engine and an exhaust system. The gas turbine engine may be arranged along an axis and include an engine core configured to discharge a core flow and a fan configured to be driven by the engine core to discharge a bypass flow. The exhaust system may be coupled to the gas turbine engine to receive mixed bypass and core flows from the gas turbine engine.

In some embodiments, the exhaust system may include a static outer structure, a noise management structure, and a thrust reverser unit. The static outer structure may be arranged around the axis to provide an outer boundary surface of a primary exhaust system flow path. The noise management structure may include a plug that defines an inner boundary surface of the primary exhaust system flow path and may be mounted for movement along the axis.

In some embodiments, the noise management structure may be configured to axially translate relative to the static outer structure between a slid-forward take-off position, a slid-forward thrust-reverse position, and a slid-aft cruise position to provide a reconfigurable exhaust nozzle. The reconfigurable exhaust nozzle may adjust a variable nozzle throat area of the exhaust system to vary noise produced by the gas turbine engine during operation of the gas turbine engine.

In some embodiments, the thrust reverser unit may include a plurality of pivot doors. The plurality of pivot doors may be configured to pivot relative to the outer structure about a pivot axis between a stored arrangement and a thrust-reversing arrangement. In the stored arrangement, the plurality of pivot doors may engage the static outer structure to provide a portion of the outer boundary surface of the primary exhaust system flow path. In the thrust-reversing arrangement, each pivot door may block at least some flow along the primary exhaust system flow path so as to direct at least some flow out of the primary exhaust system flow path and create reverse thrust.

In some embodiments, the plurality of pivot doors may have an edge that has a corresponding shape to the inner boundary surface of the plug. The corresponding shape of each pivot door may allow the edge to engage the inner boundary surface when the plurality of pivot doors are in the thrust-reversing arrangement.

In some embodiments, the plug may include a plug body and a plurality of struts. The plug body may extend axially between a nose and a tail end that is spaced apart axially from the nose. The plurality of struts may extend radially outward from the plug body to the static outer structure.

In some embodiments, the noise management structure may further include a plurality of actuator units. The plurality of actuator units may be arranged to extend between and interconnect the plurality of struts and the static outer structure. The plurality of actuator units may be configured to change the plug between the slid-forward take-off position, the slid-forward thrust-reverse position, and the slid-aft cruise position.

In some embodiments, the plurality of actuator units may each include an actuator, a guide track, and at least one carriage. The actuator may have a first end coupled to a radially outer end of a corresponding strut included in the plurality of struts and a second end coupled to the static outer structure. The guide track may be coupled to the static outer structure. The least one carriage may be coupled to the radially outer end of the corresponding strut and mounted on the guide track to translate axially along the guide track. In some embodiments, the actuator may be configured to translate the at least one carriage axially along the guide track to change the plug between the slid-forward take-off position, the slid-forward thrust-reverse position, and the slid-aft cruise position.

In some embodiments, the plurality of struts may include at least three struts. The three struts may be spaced apart circumferentially about the axis.

In some embodiments, the plurality of pivot doors may include at least three pivot doors. The three pivot doors may be arranged circumferentially between adjacent struts of the plurality of struts.

In some embodiments, the plurality of struts may include at least four struts. The four struts may be spaced apart circumferentially about the axis.

In some embodiments, the slid-forward take-off position and the slid-forward thrust-reverse position may be substantially the same position along the axis. In some embodiments, the slid-forward take-off position of the plug may provide a maximum nozzle throat area between the outer boundary surface of the static outer structure and the inner boundary surface of the plug.

In some embodiments, the slid-aft cruise position of the plug may provide a minimum nozzle throat area between the outer boundary surface of the static outer structure and the inner boundary surface of the plug. The minimum nozzle throat area may be less than the maximum nozzle throat area.

In some embodiments, the plug may be configured to translate axially between a plurality of positions. The plurality of positions may be between the slid-forward take-off position and the slid-aft cruise position.

According to another aspect of the present disclosure, an exhaust system for use with a gas turbine engine may include a static outer structure, a noise management structure, and a thrust reverser unit. The static outer structure may be arranged around an axis to provide an outer boundary surface of a primary exhaust system flow path of the exhaust system. The noise management structure may include a plug that defines an inner boundary surface of the primary exhaust system flow path and is mounted for movement along the axis.

In some embodiments, the noise management structure may be configured to axially translate relative to the static outer structure between a slid-forward take-off position, a slid-forward thrust-reverse position, and a slid-aft cruise position to provide a reconfigurable exhaust nozzle. The reconfigurable exhaust nozzle may adjust a variable nozzle throat area of the exhaust system.

In some embodiments, the thrust reverser unit may include a plurality of pivot doors. The plurality of pivot doors may be configured to pivot relative to the outer structure about a pivot axis between a stored arrangement and a thrust-reversing arrangement. In the stored arrangement, the plurality of pivot doors may provide a portion of the outer boundary surface of the primary exhaust system flow path. In the thrust-reversing arrangement, each pivot door may block at least some flow along the primary exhaust system flow path so as to direct at least some flow out of the primary exhaust system flow path and create reverse thrust.

In some embodiments, the plurality of pivot doors may have a corresponding shape to the inner boundary surface of the plug in the slid-forward thrust-reverse position. The corresponding shape may be at a location radially inward of the plurality of pivot doors so that the plurality of pivot doors engage the plug when the plurality of pivot doors are in the thrust-reversing arrangement.

In some embodiments, the plug may include a plug body and a plurality of struts. The plug body may extend axially between a nose and a tail end. The plurality of struts may extend radially outward from the plug body to the static outer structure.

In some embodiments, the noise management structure may further include a plurality of actuators. The plurality of actuators may be arranged to extend between and interconnect the plurality of struts and the static outer structure. The plurality of actuators may be configured to change the plug between the slid-forward take-off position, the slid-forward thrust-reverse position, and the slid-aft cruise position.

In some embodiments, the plurality of struts may include at least three struts. The three struts may be spaced apart circumferentially about the axis.

In some embodiments, the plurality of pivot doors may include at least three pivot doors. The plurality of pivot doors may be arranged circumferentially between adjacent struts of the plurality of struts.

In some embodiments, the plurality of struts may include at least four struts. The four struts may be spaced apart circumferentially about the axis.

In some embodiments, the slid-forward take-off position and the slid-forward thrust-reverse position may be substantially the same position along the axis. In some embodiments, the slid-forward take-off position of the plug may provide a maximum nozzle throat area between the outer boundary surface of the static outer structure and the inner boundary surface of the plug.

In some embodiments, the slid-aft cruise position of the plug may provide a minimum nozzle throat area between the outer boundary surface of the static outer structure and the inner boundary surface of the plug. The minimum nozzle throat area may be less than the maximum nozzle throat area.

According to another aspect of the present disclosure, a method may include several steps. The method may include providing an exhaust system for use with a gas turbine engine.

In some embodiments, the exhaust system may include a static outer structure, a noise management structure, and a thrust reverser unit. The static outer structure may be arranged around an axis to provide an outer boundary surface of a primary exhaust system flow path of the exhaust system. The noise management structure may include a plug arranged around the axis to provide an inner boundary surface of the primary exhaust system flow path. The plug may be mounted for movement along the axis relative to the static outer structure to provide a reconfigurable exhaust nozzle. The thrust reverser unit may include a plurality of pivot doors configured to pivot relative to the outer structure about a pivot axis.

In some embodiments, the method may further include directing the plug to translate axially along the axis relative to the static outer structure to a slid-forward take-off position. The slid-forward take-off position may provide a maximum nozzle throat area of the reconfigurable exhaust nozzle.

In some embodiments, the method may further include directing the plug to translate axially along the axis relative to the static outer structure to a slid-aft cruise position. The slid-aft cruise position may provide a minimum nozzle throat area of the reconfigurable exhaust nozzle.

In some embodiments, the method may further include directing the plug to translate along the axis relative to the static outer structure to a slid-forward thrust-reverse position and directing the pivot doors to move from a stored arrangement to a thrust-reversing arrangement when the plug is in the slid-forward thrust-reverser position. The pivot doors may move from the stored arrangement to the thrust-reversing arrangement to block at least some flow along the primary exhaust system flow path and direct at least some flow out of the primary exhaust system flow path and create reverse thrust.

In some embodiments, the method may further include providing a controller. The controller may be coupled to the exhaust system.

In some embodiments, the controller may be configured to direct the plug to translate axially along the axis to the slid-forward take-off position in response to a first input. The controller may be configured to direct the plug to translate axially along the axis to the slid-aft cruise position in response to a second input. The controller may be configured to direct the plug to translate axially along the axis to the slid-forward thrust-reverse position and the plurality of pivot doors to pivot about the axis to the thrust-reversing arrangement in response to a third input.

These and other features of the present disclosure will become more apparent from the following description of the illustrative embodiments.

DETAILED DESCRIPTION OF THE DRAWINGS

Figure 1:
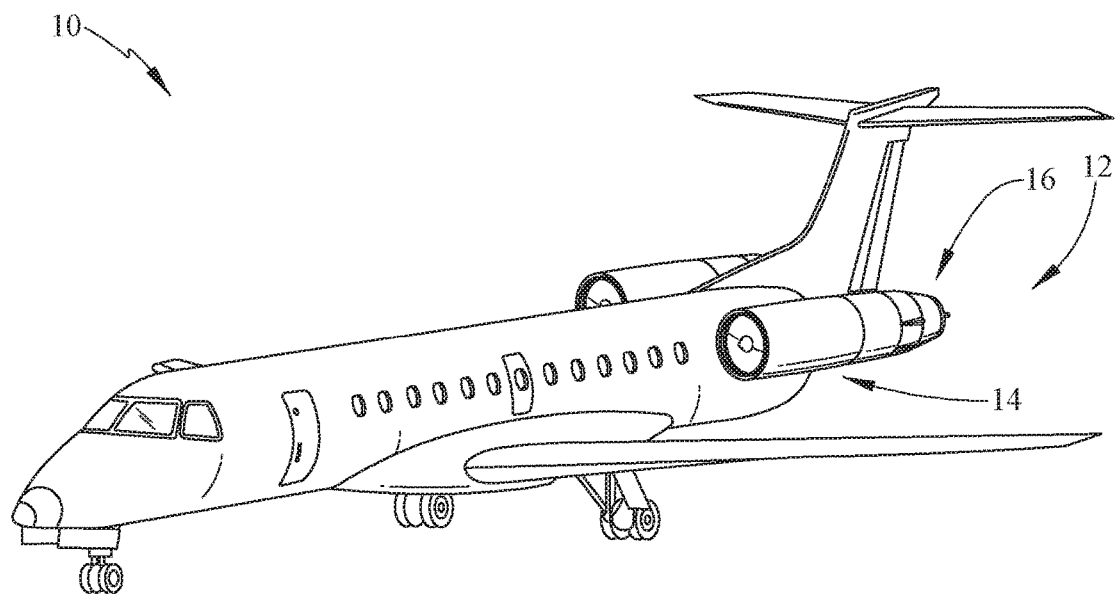
FIG. 1 is perspective view of an aircraft showing the aircraft includes an airframe and a propulsion unit having a gas turbine engine coupled to the airframe and an exhaust system coupled to the gas turbine engine to receive exhaust products from the gas turbine engine and direct the exhaust products to propel the airframe.

For the purposes of promoting an understanding of the principles of the disclosure, reference will now be made to a number of illustrative embodiments illustrated in the drawings and specific language will be used to describe the same.

Figure 2:
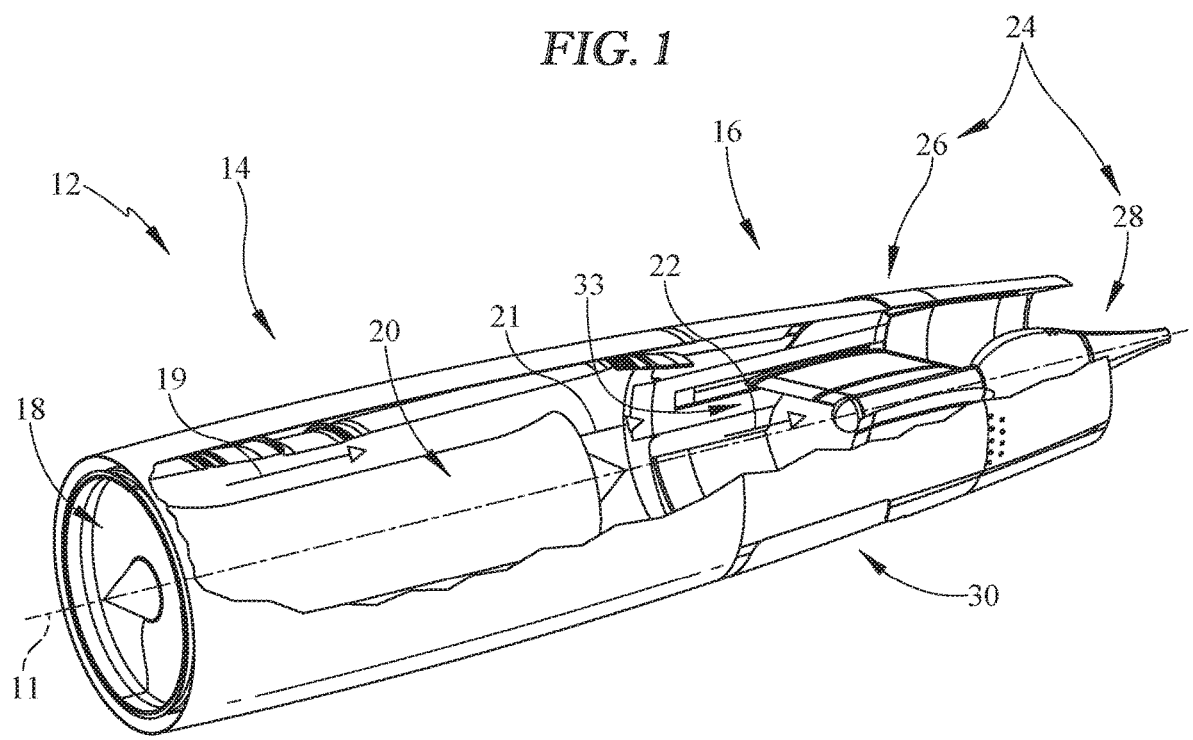
FIG. 2 is perspective view of the propulsion unit included in the aircraft of FIG. 1 showing the engine includes an engine core configured to discharge a core flow and a fan configured to be driven by the engine core to discharge a bypass flow, and showing the exhaust system includes (i) a static outer structure coupled to the gas turbine engine to receive the mixed core and bypass flows, (ii) a noise management structure mounted to the outer structure for movement along the axis between a slid-forward take-off position, a slid-forward thrust-reverse position, and a slid-aft cruise position to provide a reconfigurable exhaust nozzle that controls a variable nozzle throat area of the exhaust system, (iii) and a thrust reverser unit integrated into the static outer structure that redirects the mixed exhaust products flowing through the reconfigurable exhaust nozzle to provide reverse thrust.
Figure 3:
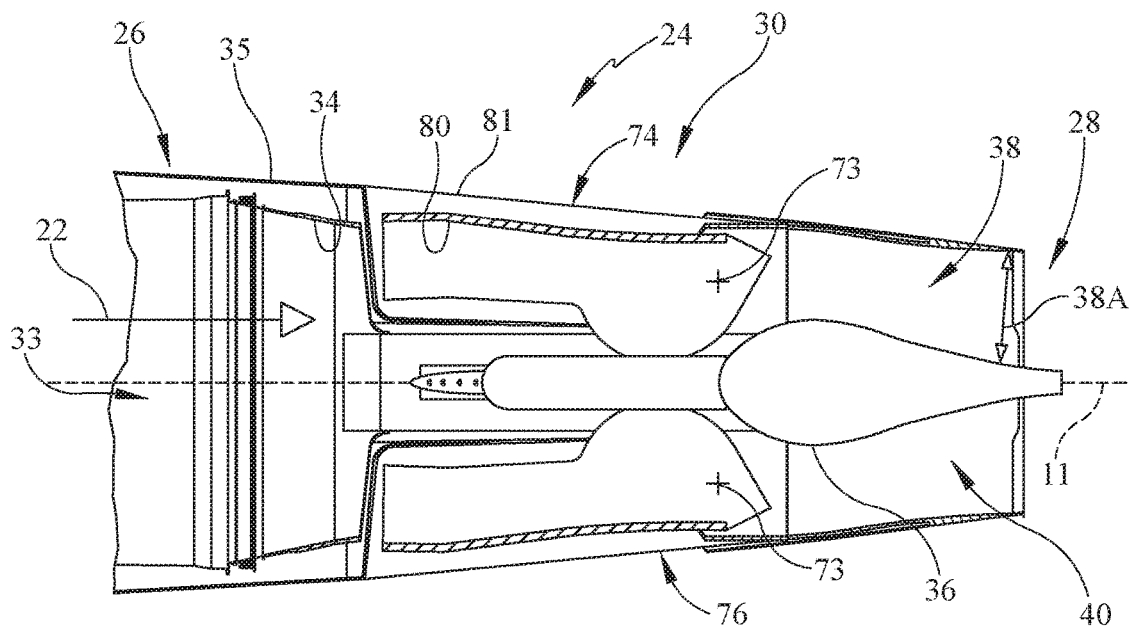
FIG. 3 is a cross-section view of the exhaust system of the propulsion unit of FIG. 2 showing the noise management structure in the slid-forward take-off position to provide a maximum nozzle throat area of the reconfigurable exhaust nozzle, and showing the thrust reverser unit in a stored arrangement in which pivot doors of the thrust reverser unit are closed and define a portion of an outer boundary surface of the static outer structure.

A propulsion unit 12 for an aircraft 10 according to the present disclosure includes a gas turbine engine 14 and an exhaust system 16 coupled to the gas turbine engine 14 as shown in FIGS. 1 and 2. The gas turbine engine 14 includes a fan 18 and an engine core 20 having a compressor, a combustor, and a turbine arranged axially along an axis 11 as shown in FIG. 3. The engine core 20 is configured to discharge a core flow 21, while the fan 18 is configured to be driven by the engine core 20 to discharge a bypass flow 19 that provides thrust for propelling an aircraft 10. The exhaust system 16 is coupled to the gas turbine engine 14 so as to receive the bypass and core flows 19, 21 in a combined exhaust flow 22 from the gas turbine engine 14. The exhaust system 16 has a variable nozzle throat area 38 that can be changed to optimize the combined exhaust flow 22 for low noise emissions such as, for example, during take-off and landing, or for increased engine efficiency, for example, at cruise.

Figure 4:
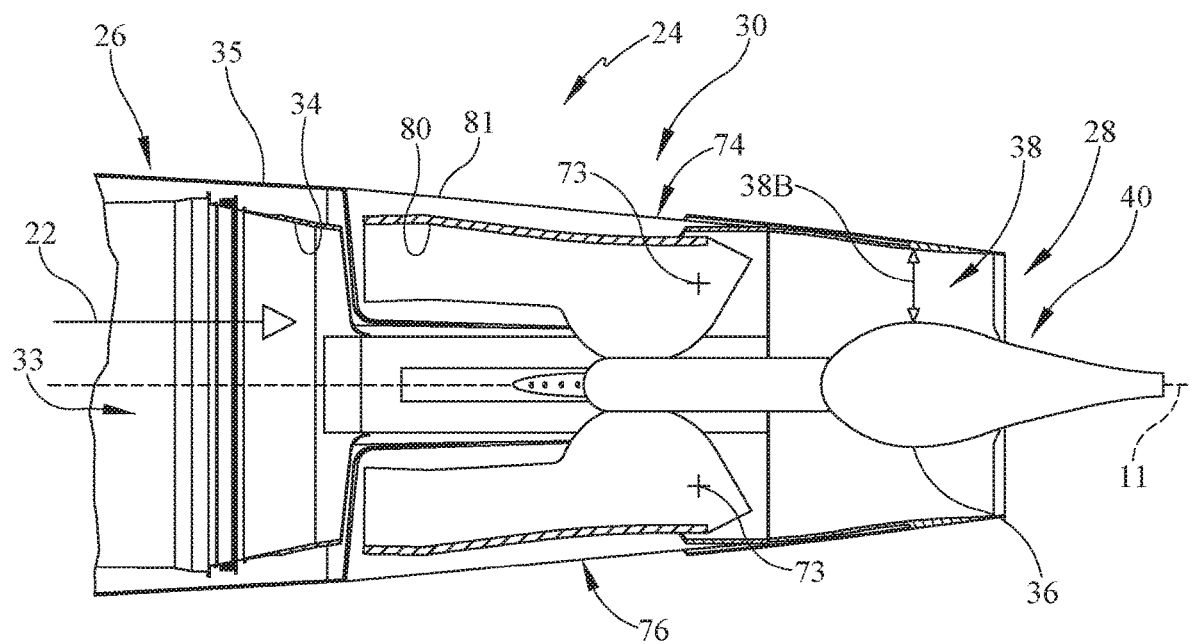
FIG. 4 is a cross-section view of the exhaust system of the propulsion unit of FIG. 2 showing the noise management structure translated axially aft from the slid-forward take-off position to the slid-aft cruise position to provide a minimum nozzle throat area of the reconfigurable exhaust nozzle and the thrust reverser unit in the stored arrangement.
Figure 5:
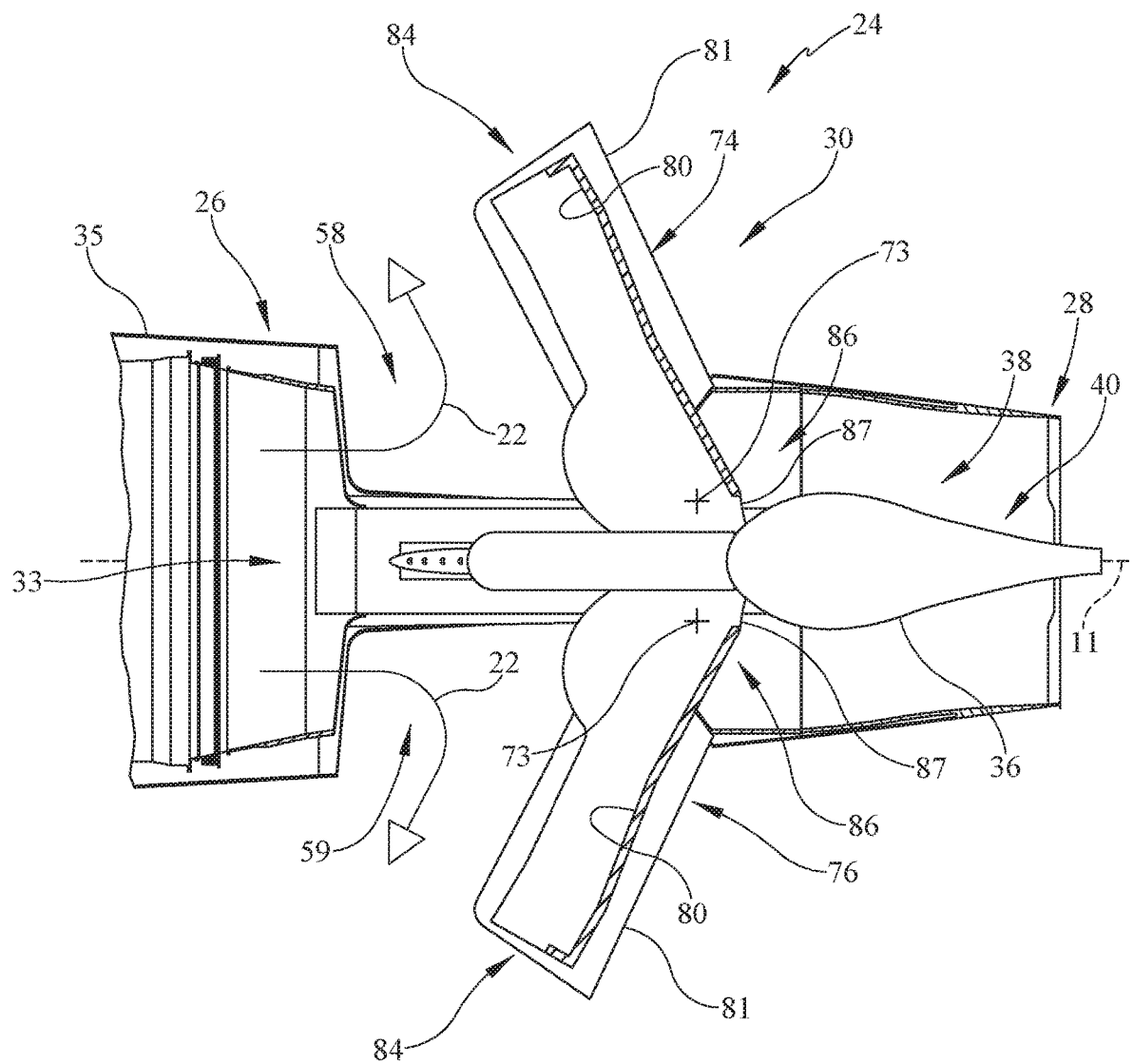
FIG. 5 is a cross-section view of the exhaust system of the propulsion unit of FIG. 2 showing the noise management structure translated axially forward from the slid-aft cruise position to the slid-forward thrust-reverser position, and showing the thrust reverser unit in a thrust-reversing arrangement in which the pivot doors have been deployed so that the pivot doors engage a plug included in the noise management structure to redirect the exhaust products out of a primary flow path of the exhaust system.

The exhaust system 16 includes a static outer structure 26, a noise management structure 28, and a thrust reverser unit 30 as shown in FIGS. 2-6. The static outer structure 26, or jet pipe 26, is arranged around the axis 11 to provide an outer boundary surface 34 of a primary exhaust system flow path 33. The noise management structure 28 includes a plug 40 that is arranged around the axis 11 to provide an inner boundary surface 36 of the primary exhaust system flow path 33. The plug 40 is mounted for movement along the axis 11 to control the variable nozzle throat area 38 of the exhaust system 16 that is formed between the outer boundary surface 34 of the jet pipe 26 and the inner boundary surface 36 of the plug 40. The thrust reverser unit 30 is integrated into the jet pipe 26 to provide a portion of the outer boundary surface 34 when in a stored arrangement as shown in FIGS. 3 and 4. The thrust reverser unit 30 is also configured to engage the plug 40 to block the mixed exhaust flow 22 in the flow path 33 to provide reverse thrust when in a thrust-reversing arrangement as shown in FIG. 5.

For supersonic speed aircrafts, there are several noise regulations limiting the amount of noise produced by the gas turbine engines of the aircrafts. These noise regulations may be dependent of the weight of the aircraft and not the size of the engine. Therefore, a lighter aircraft 10 that is designed to travel at supersonic speeds may need to control the noise produced by the engine 14 at take-off to meet the noise regulations, but also be able to increase the acceleration of the exhaust products 22 at cruise to reach supersonic speeds.

To control the noise produced by the engine 14 at different points of the flight cycle of the aircraft 10, the plug 40 is configured to axially translate relative to the jet pipe 26 between a slid-forward take-off position as shown in FIG. 3, a slid-aft cruise position as shown in FIG. 4, and a slid-forward thrust-reverse position as shown in FIG. 5. In this way, the jet pipe 26 and the noise management structure 28 together provide a reconfigurable exhaust nozzle 24 as shown in FIGS. 2-6. The reconfigurable exhaust nozzle 24 adjusts the variable nozzle throat area 38 of the exhaust system 16 to control the noise produced by the gas turbine engine 14 during operation of the gas turbine engine 14 at different points of the flight cycle of the aircraft 10 such as take-off and landing.

When the plug 40 is in the slid-forward take-off position, the outer boundary surface 34 and the inner boundary surface 36 provide a convergent nozzle shape with a maximum nozzle throat area 38A as shown in FIG. 3. The maximum nozzle throat area 38A allows for a higher mass flow of exhaust products 22 at a lower speed through the reconfigurable exhaust nozzle 24, which results in lower noise emissions. The lower noise emissions may be helpful for meeting certain noise requirements for ground-level and low-flight level operation such as take-off and landing. As one example, the noise requirements may be related to certain zones around airports such as residential areas. An increased throat area can increase propulsion system efficiency in subsonic or transonic operation where inlet spillage or interactions with other aircraft structures would increase drag.

When the plug 40 is in the slid-aft cruise position, the outer boundary surface 34 and the inner boundary surface 36 provide a convergent-divergent nozzle shape with a minimum nozzle throat area 38B as shown in FIG. 4. The minimum nozzle throat area 38B allows for flow acceleration of the exhaust products 22 and increased engine efficiency, for example, at aircraft speeds above Mach 1.0. The minimum nozzle throat area 38B may cause the reconfigurable exhaust nozzle 24 to generate noise at greater decibel levels as compared to the maximum nozzle throat area 38A. As such, the plug 40 may be in the slid-aft cruise position at higher altitudes and/or outside of restricted noise zones.

When the plug 40 is in the slid-forward thrust-reverse position, the plug 40 is positioned axially forward so that the thrust reverser unit 30 may change from the stored arrangement to the thrust-reversing arrangement and engage the plug 40 as shown in FIG. 5. The thrust reverser unit 30 includes a plurality of pivot doors 74, 76 that are configured to pivot relative to the jet pipe 26 about a pivot axis 73 between the different arrangements. The arrangement of the pivot doors 74, 76 allows the reconfigurable exhaust nozzle 24 to change between the different nozzle shapes easily, while also being able to deploy thrust reverse when needed.

When the thrust reverser unit 30 is in the stored arrangement, the plurality of pivot doors 74, 76 engage the jet pipe 26 to provide a portion of the outer boundary surface 34 of the primary exhaust system flow path 33. Each pivot door 74, 76 engages the jet pipe 26 to close apertures 58, 59 formed in the jet pipe 26 so that the exhaust products 22 flow axially aft through the exhaust system 16.

When the thrust reverser unit 30 is in the thrust-reversing arrangement, the pivot doors 74, 76 have pivoted about the pivot axis 73 to open the apertures 58, 59 formed in the jet pipe 26 and block at least some of the mixed flow 22 along the primary exhaust system flow path 33. Each pivot door 74, 76 extends into the flow path 33 and through the corresponding aperture 58, 59 so as to direct at least some flow 22 out of the primary exhaust system flow path 33 through the apertures 58, 59 and create reverse thrust.

In the illustrative embodiment, each of the pivot doors 74, 76 is shaped to accommodate the plug 40 when the plug 40 is in the slid-forward thrust-reverse position as shown in FIG. 5. At a location radially inward on each pivot door 74, 76, each pivot door 74, 76 has a corresponding shape to the inner boundary surface 36 of the plug 40. The pivot doors 74, 76 correspond to the shape of the inner boundary surface 36 of the plug 40 so that the pivot doors 74, 76 may engage the plug 40 when the plug 40 in the slid-forward thrust-reverse position and the plurality of pivot doors 74, 76 are in the thrust-reversing arrangement.

In the illustrative embodiment, each pivot door 74, 76 is shaped to include a cutout 87 as shown in FIG. 5. The cutout 87 is sized to receive the plug 40 when the plug 40 in the slid-forward thrust-reverse position and the thrust reverser unit 30 is in the thrust-reversing arrangement.

In the illustrative embodiment, the slid-forward take-off position and the slid-forward thrust-reverse position of the plug 40 is substantially the same position along the axis 11. In this way, during take-off and landing the thrust reverse unit 30 may be changed from the stored arrangement to the thrust-reversing arrangement or vice versa as safety precaution.

In the illustrative embodiment, the plug 40 is also configured to axially translate to any one position of a plurality of positions between the slid-forward take-off positon and the slid-aft cruise position. The plurality of positions correspond to different variable nozzle throat areas for the exhaust system 16.

Figure 6:
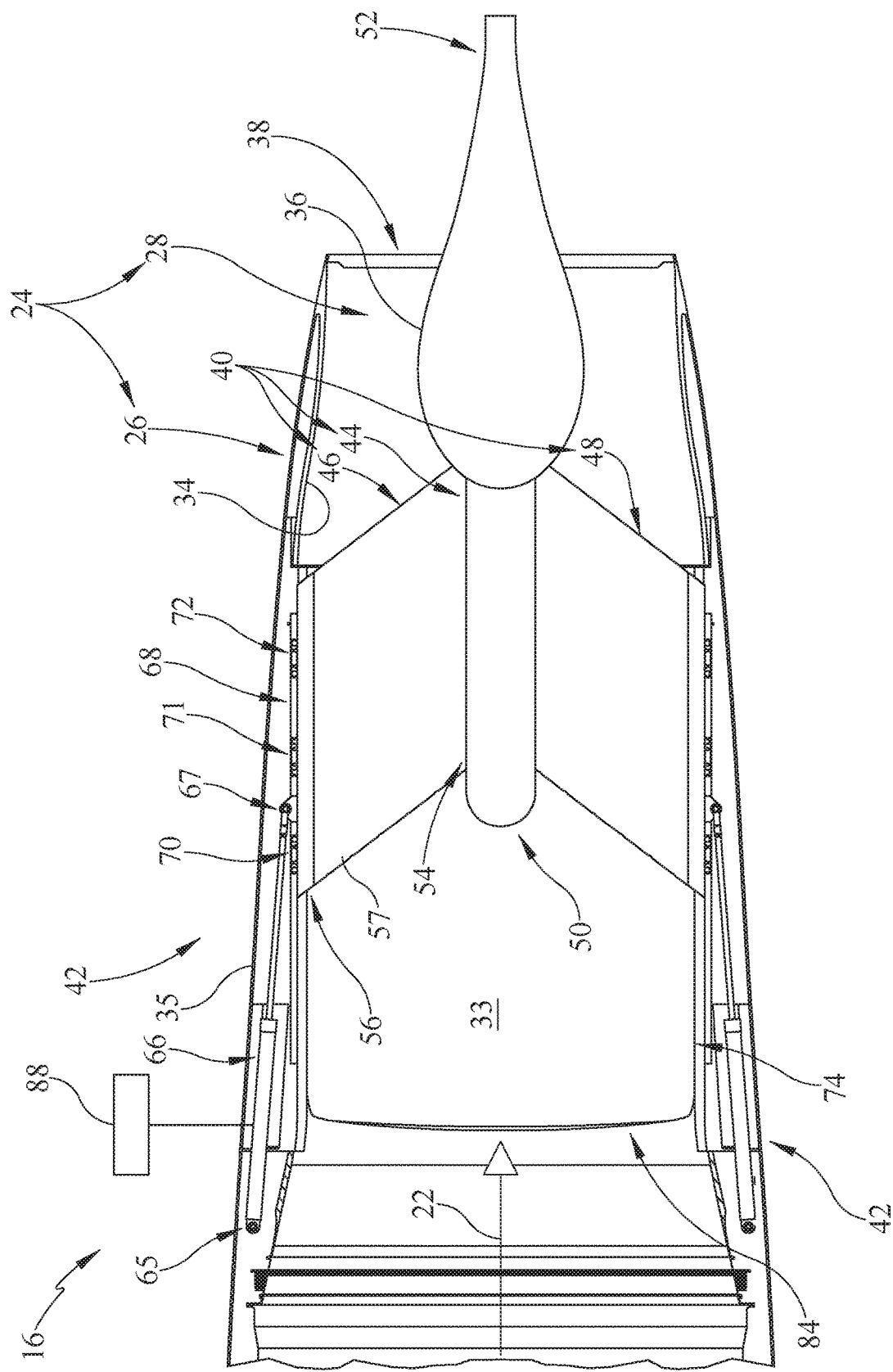
FIG. 6 is a cross-section view of the exhaust system at a different circumferential position than FIGS. 4-5 showing the noise management structure further includes a plurality of actuator units that extend between and interconnect a plurality of struts included in the plug and the static outer structure to change the plug between the slid-forward take-off position, the slid-forward thrust-reverse position, and the slid-aft cruise position.

Turning again to the noise management structure 28, the plug 40 includes a plug body 44 and a plurality of support struts 46, 48 as shown in FIG. 6. The plug body 44 extends axially between a nose 50 and a tail end 52 spaced axially aft of the nose 50. The inner boundary surface 36 of the primary exhaust system flow path 33 is formed by an outer surface of the plug body 44 that extends between the nose 50 and the tail end 52. The plurality of support struts 46, 48 extend radially outward from the plug body 44 to the jet pipe 26 and are spaced circumferentially about the axis 11.

In the illustrative embodiments, the plurality of struts 46, 48 include at least two struts 46, 48 as shown in FIG. 6. The struts 46, 48 are equally spaced apart circumferentially about the axis 11. The apertures 58, 59 formed in the jet pipe 26 are circumferentially offset from the struts 46, 48 so as to allow the pivot doors 74, 76 of the thrust reverser unit 30 to change between the stored and thrust-reversing arrangements.

In some embodiments, the struts 46, 48 may be spaced closer together. In such embodiments, the pivot doors 74, 76 would be sized accordingly to match the size of the apertures 58, 59 formed in the jet pipe 26 in when in the stored arrangement and be able to extend through the apertures 58, 59 when in the thrust-reversing arrangement.

Figure 7:
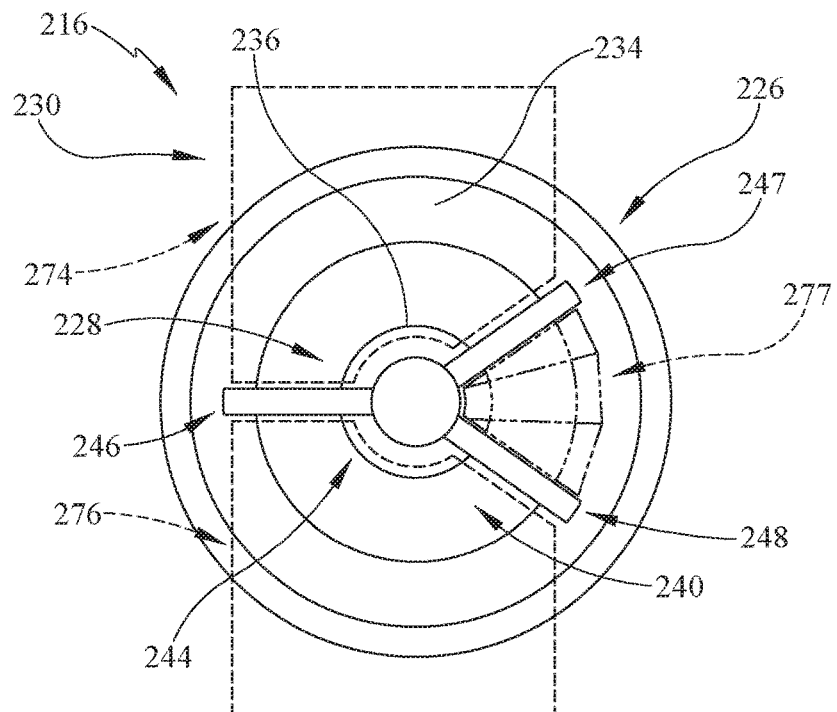
FIG. 7 is a front view of another embodiment of an exhaust system for use with the aircraft of FIG. 1 showing the exhaust system includes (i) a static outer structure, (ii) a translating noise management structure that has a plug with a plug body and at least three struts that extend radially outward from the plug body and couple to the outer structure of the exhaust nozzle, and (iii) a thrust reverser unit that has at least two pivot doors arranged between the struts of the noise management structure and a plurality of blocker doors arranged to divert at least part of the exhaust flow to the pivot doors.
Figure 8:
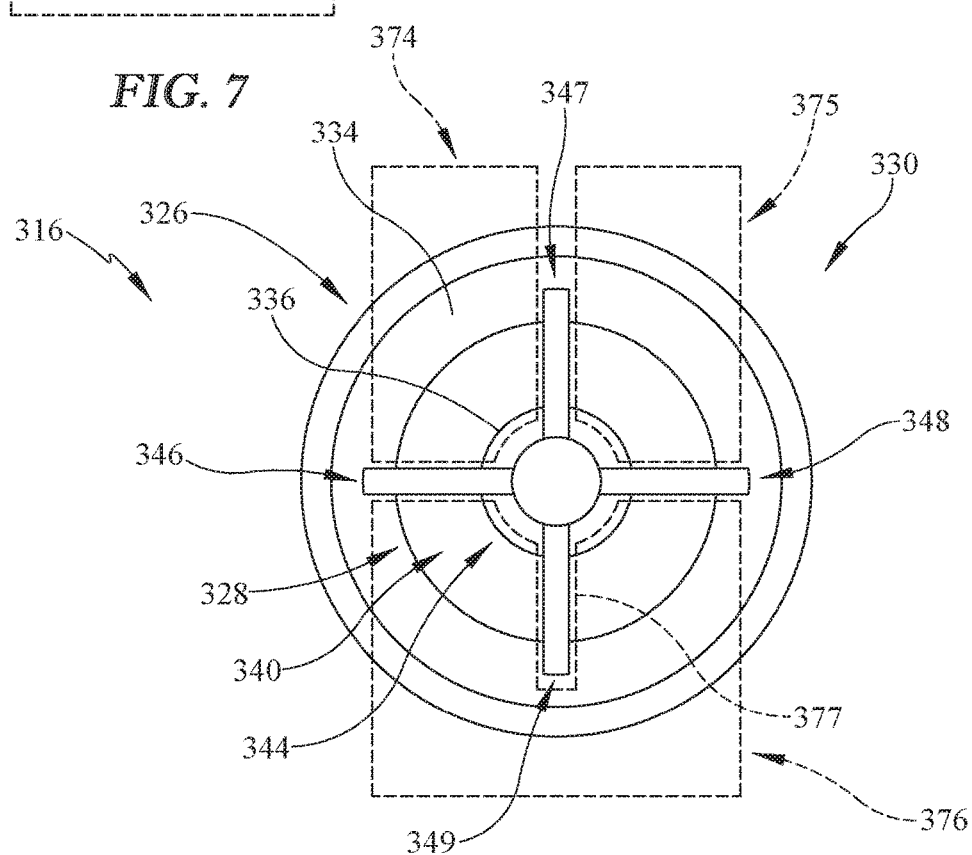
FIG. 8 is a front view of another embodiment of an exhaust system for use with the aircraft of FIG. 1 showing the exhaust system includes (i) a static outer structure, (ii) a translating noise management structure that has a plug with a plug body and at least four struts that extend radially outward form the plug body and coupled to the outer structure of the exhaust system, and (iii) a thrust reverser unit that may have two, three, or four pivot doors arranged in a manner to efficiently extend between the struts of the noise management structure.

In some embodiments, the plug 40 may only include one strut 46, 48. In other embodiments, the plurality of struts 46, 48 may include more than two struts as shown in FIGS. 7 and 8.

In the illustrative embodiment, the plug body 44 includes an internal center body support structure (not shown) that receives loads applied by the exhaust products in the flow path 33. The internal center body support structure transfers the load to the struts 46, 48 and out to the jet pipe 26. The inner boundary surface 36 forms an outer skin that surrounds the internal center body support structure and shields the support structure from the exhaust products 22 in the flow path 33.

Each strut 46, 48 includes an internal support structure (not shown) that couples to the internal center body support structure of the plug body 44 at a first end 54 of the strut 46, 48 and couples to the outer structure 26 at a second end 56 of the strut 46, 48. The internal support structure is configured to transfer loads applied to the plug 40 to the outer structure 26. An outer skin 57 surrounds the internal support structure and forms an outer surface 57 of the strut 46, 48.

In the illustrative embodiment, the noise management structure 28 further includes a plurality of actuator units 42 as shown in FIG. 6. The actuator units 42 are arranged to extend between and interconnect the plurality of struts 46, 48 and the static outer structure 26 to change the plug 40 between the slid-forward take-off position, the slid-forward thrust-reverse position, and the slid-aft cruise position.

The plurality of actuator units 42 each include an actuator 66, a guide track 68, and at least one carriage 70 as shown in FIG. 6. The actuator 66 has a first end 65 coupled to the jet pipe 26 and a second end 67 coupled to the radially outer end 56 of the corresponding strut 46, 48 included in the plurality of struts 46, 48. In the illustrative embodiment, the first and second ends 65, 67 of the actuator 66 are pin joints. The guide track 68 is coupled to the static outer structure 26, while the carriage 70 is coupled to the radially outer end 56 of the corresponding strut 46, 48. The guide track 68 is fixed to the static outer structure 26 to transfer loads received by the plug 40 to the outer structure 26. The carriage 70 is mounted on the guide track 68 to translate axially along the guide track 68.

In the illustrative embodiment, each actuator unit 42 includes at least three carriages 70, 71, 72 as shown in FIG. 6. In some embodiments, the actuator unit 42 may include two carriages. In other embodiments, the actuator unit 42 may include more than three carriages.

In the illustrative embodiment, the actuator units 42 are located between the outer boundary surface 34 and an outer nacelle surface 35 of the exhaust system 16 as shown in FIG. 2. The outer nacelle surface 35 is arranged to extend about the axis 11 and encase the other components of the exhaust system 16. The actuator units 42 are positioned between the surface 34 and the outer nacelle surface 35 outside of the flow path 33 to protect the actuator units 42 from the exhaust products 22 in the flow path 33. Positioning the actuator units 42 outside of the flow path 33 also provides an aerodynamic flow path 33 for the exhaust products 22.

The actuator 66 is configured to translate the carriages 70, 71, 72 along the guide track 68 to change the plug 40 between the slid-forward take-off position, the slid-forward thrust-reverse position, and the slid-aft cruise position. In the illustrative embodiment, the actuator 66 is a hydraulic linear actuator. In other embodiments, the actuator 66 may be another type of liner actuator. In some embodiments, the actuator 66 may be a pneumatic actuator or another suitable actuator.

The thrust reverser unit 30 includes the plurality of pivot doors 74, 76 and an actuator (not shown). The pivot doors 74, 76 are shaped to close the apertures in the jet pipe 26 and provide a portion of the outer boundary surface 34 of the flow path 33. The actuator is coupled to the jet pipe 26 and is configured to change the pivot doors 74, 76 between the stored and thrust-reversing arrangements.

In some embodiments, the thrust reverser unit 30 may also include a lock (not shown). The lock may be configured to block the actuator from changing the pivot doors 74, 76 between the different arrangements.

Each pivot door 74, 76 has an inner surface 80 and an outer surface 81 as shown in FIG. 5. Each surface 80, 81 extends between a leading edge 84 and a trailing edge 86 spaced axially aft of the leading edge 84.

When the pivot doors 74, 76 are in the stored arrangement, the edges 84, 86 of the doors 74, 76 engage the outer edge of the apertures 58, 59 formed in the jet pipe 26. In this way, the doors 74, 76 close the apertures 58, 59 so that the inner surface 80 provides the portion of the outer boundary surface 34 of the flow path 33 and the outer surface 81 is flush with the outer nacelle surface 35 of the jet pipe 26.

When the pivot doors 74, 76 are in the thrust-reversing arrangement, the trailing edge 86 are in confronting relation to the inner boundary surface 36 of the plug 40 and the leading edge 84 extends through the corresponding aperture in the jet pipe 26. In this way, a portion of the door 74, 76 is angled into the flow path 33 so that the inner surface 80 blocks the exhaust products 22 along the primary exhaust system flow path 33. The other portion of the pivot door 74, 76 is positioned radially outside of the outer nacelle surface 35 of the jet pipe 26 so that the inner surface 80 continues to direct at least some flow 22 out of the flow path 33 and create reverse thrust.

In the illustrative embodiment, the trailing edge 86 of each of the pivot doors 74, 76 is shaped to accommodate the plug 40. The trailing edge 86 has a corresponding shape or cutout 87 that coincide with the inner boundary surface 36 of the plug 40 when the plurality of pivot doors 74, 76 are in the thrust-reversing arrangement. In some embodiments, the trailing edge 86 engages the inner boundary surface 36 of the plug 40.

In the illustrative embodiment, the propulsion unit 12 further includes a controller 88 as shown in FIG. 6. The controller 88 is coupled to the actuator units 42 of the noise management structure 28 and the actuator of the thrust reverser unit 30. The controller 88 is configured to direct the noise management structure 28 and the thrust reverser unit 30 to change between the different positions and arrangements in response to an input from a user, such as, for example a pilot piloting the aircraft 10. In other embodiments, the controller 88 is configured to direct the noise management structure 28 and the thrust reverser unit 30 to change between the different positions and arrangement based on the flight cycle of the engine 14.

In the illustrative embodiment, the controller 88 is configured to receive a first input that corresponds to a take-off mode. Upon receiving the first input, the controller 88 provides an electronic signal to the actuators 66 to move the plug 40 axially forward to the slid-forward take-off position. The controller 88 holds the plug 40 in this position until a different input is received.

In the illustrative embodiment, the controller 88 is configured to receive a second input that corresponds to a cruise mode. Upon receiving the second input, the controller 88 provides a signal to the actuators 66 to translate the plug 40 axially aft to the slid-aft cruise position. The controller 88 holds the plug 40 in this position until a different input is received.

The controller 88 may receive another input to hold and stop the plug 40 in one position within the plurality of positions between the slid-forward take-off positon and the slid-aft cruise position, including the take-off position and the cruise position. In some embodiments, it might be advantageous to hold the plug 40 relative to the jet pipe 26 in other axial translation positions within the plurality of positions to tune the reconfigurable exhaust nozzle 24 for a certain point in the engine cycle or an aircraft maneuver. In some embodiments, the controller 88 may be configured to direct the actuator 66 to translate the plug 40 at a predetermined speed within the plurality of positions.

In some embodiments, the controller 88 blocks the plug 40 from being stopped and held in position in some of the plurality of positions to reduce damage and wear to the reconfigurable exhaust nozzle 24 caused by dynamic responses that occur when the plug 40 is in certain positions. In other embodiments, the controller 88 is configured to block the plug 40 and hold it in position in any of the plurality of positions. The plurality of positions may include a preset and finite number of positions or may include a continuous infinite number of positions.

In some embodiments, the controller 88 moves the plug 40 faster through some of the plurality of positions to reduce damage and wear to the reconfigurable exhaust nozzle 24 caused by dynamic responses that occur when the plug 40 is in certain positions. The plurality of positions may result in different shapes of the reconfigurable exhaust nozzle 24 that may be convergent, convergent-divergent, or a transitional shape between convergent and convergent-divergent.

In the illustrative embodiment, the controller 88 is configured to receive a third input that corresponds to a thrust reverse mode. Upon receiving the third input, the controller 88 provides a signal to the actuators 66 to translate the plug 40 axially forward to the slid-forward thrust-reverse position. The controller 88 also provides a signal to the actuators of the thrust reverse unit 30 to pivot the pivot doors 74, 76 from the stored arrangement to the thrust-reversing arrangement. The controller 88 holds the plug 40 and the pivot doors 74, 76 in this position/arrangement until a different input is received.

A method of using the propulsion unit 12 may include several steps. At take-off, the controller 88 receives the first input that corresponds to the take-off mode. The controller 88 then directs actuators 66 to the translate the plug 40 axially forward along the axis 11 to the slid-forward take-off position to provide the maximum nozzle throat area 38A of the reconfigurable exhaust nozzle 24. The controller 88 directs the actuators 66 to hold the plug 40 in the slid-forward take-off position until a different input is received.

After the aircraft 10 is at the desired altitude, the controller 88 may then receive the second input that corresponds to the cruise mode. The controller 88 then directs the actuators 66 to translate the plug 40 axially aft along the axis 11 to the slid-aft cruise position to provide the minimum nozzle throat area 38B of the reconfigurable exhaust nozzle 24. The controller 88 directs the actuators 66 to hold the plug 40 in the slid-aft cruise position until a different input is received.

Between the take-off and cruise modes, the controller 88 may receive another input that causes the controller 88 to direct the actuators 66 to translate the plug 40 to another position from a plurality of positions between the take-off and cruise positions. The controller 88 may direct the actuators 66 to hold the plug 40 in this position until a different input is received.

Upon landing, the controller 88 may receive the third input that corresponds to a thrust reverse mode. The controller 88 then directs the actuators 66 to translate the plug 40 along the axis relative to the static outer structure 26 to the slid-forward thrust-reverse position. The controller 88 the directs the actuator to pivot the pivot doors 74, 76 from the stored arrangement to the thrust-reversing arrangement when the plug 40 is in the slid-forward thrust-reverser position. The controller 88 directs the plug 40 and the pivot doors 74, 76 to hold in this position/arrangement until a different input is received.

Another embodiment of an exhaust system 216 in accordance with the present disclosure is shown in FIG. 7. The exhaust system 216 is substantially similar to the exhaust system 16 shown in FIGS. 1-6 and described herein. Accordingly, similar reference numbers in the 200 series indicate features that are common between the exhaust system 16 and the exhaust system 216. The description of the exhaust system 16 is incorporated by reference to apply to the exhaust system 216, except in instances when it conflicts with the specific description and the drawings of the exhaust system 216.

The exhaust system 216 includes a static outer structure 226, a noise management structure 228, and a thrust reverser unit 230 as shown in FIG. 7. The static outer structure 226 is arranged around the axis 11 to provide an outer boundary surface 234. The noise management structure 228 includes a plug 240 that is arranged around the axis to provide an inner boundary surface 236. The plug 240 is mounted for movement along the axis 11 to control the variable nozzle throat area 38 formed between the outer boundary surface 234 of the jet pipe 226 and the inner boundary surface 236 of the plug 240. The thrust reverser unit 230 is integrated into the jet pipe 226 and configured to change between the stored arrangement and the thrust-reversing arrangement.

The plug 240 includes a plug body 244 and a plurality of struts 246, 247, 248 as shown in FIG. 7. The plug body 244 is arranged circumferentially about the axis 11. An outer surface of the plug body 244 defines the inner boundary surface 236. The plurality of support struts 246, 247, 248 extend radially outward from the plug body 244 to the jet pipe 226 and are spaced circumferentially about the axis 11. In the illustrative embodiments, the plurality of struts 246, 247, 248 include three struts 246, 247, 248 as shown in FIG. 7.

The thrust reverser unit 230 includes a plurality of pivot doors 274, 276 and a blocker door 277 as suggested in FIG. 7. The plurality of pivot doors 274, 276 includes two pivot doors 274, 276 arranged circumferentially between the adjacent struts 246, 247 and the adjacent struts 246, 248. The blocker door 277 is arranged circumferentially between the struts 247, 248 and is configured to pivot radially inward to engage the plug 240 and block at least some flow.

In the illustrative embodiment, a portion of the jet pipe 226 may be shaped to include cascades at the aperture closed by the blocker door 277. Unlike the pivot doors 274, 276 which extend through apertures in the jet pipe 226 to direct the exhaust products and provide reverse thrust, The blocker door 277 directs the flow of exhaust products 22 through the cascades in the aperture. The cascades are configured to direct the exhaust products 22 axially forward to provide reverse thrust.

The three struts 246, 247, 248 are circumferentially spaced apart about the axis 11 to provide gaps for the corresponding pivot door 274, 276 and blocker door 277 to engage the plug 240 therebetween. In the illustrative embodiment, the first strut 246 is equally spaced apart from the second strut 247 and the third strut 248. The second and third struts 247, 248 are spaced closer together so that the gap therebetween is smaller.

In the illustrative embodiment, the apertures formed in the jet pipe 226 are circumferentially offset from the struts so as to allow the pivot doors 274, 276, and the blocker door 277 of the thrust reverser unit 230 to change between the stored and thrust-reversing arrangements.

Another embodiment of an exhaust system 316 in accordance with the present disclosure is shown in FIG. 8. The exhaust system 316 is substantially similar to the exhaust system 16 shown in FIGS. 1-6 and described herein. Accordingly, similar reference numbers in the 300 series indicate features that are common between the exhaust system 16 and the exhaust system 316. The description of the exhaust system 16 is incorporated by reference to apply to the exhaust system 316, except in instances when it conflicts with the specific description and the drawings of the exhaust system 316.

The exhaust system 316 includes a static outer structure 326, a noise management structure 328, and a thrust reverser unit 330 as shown in FIG. 8. The static outer structure 326 is arranged around the axis 11 to provide an outer boundary surface 334. The noise management structure 328 includes a plug 340 that is arranged around the axis to provide an inner boundary surface 340. The plug 340 is mounted for movement along the axis 11 to control the variable nozzle throat area 38 formed between the outer boundary surface 334 of the jet pipe 326 and the inner boundary surface 336 of the plug 340. The thrust reverser unit 330 is integrated into the jet pipe 326 and configured to change between the stored arrangement and the thrust-reversing arrangement.

The plug 340 includes a plug body 344 and a plurality of struts 346, 347, 348, 349 as shown in FIG. 8. The plurality of support struts 346, 347, 348, 349 extend radially outward from the plug body 344 to the jet pipe 326 and are spaced circumferentially about the axis 11. In the illustrative embodiments, the plurality of struts 346, 347, 348, 349 include four struts 346, 347, 348, 349 equally spaced apart circumferentially about the axis 11 as shown in FIG. 8.

The thrust reverser unit 330 includes a plurality of pivot doors 374, 375, 376 as shown in FIG. 8. The plurality of pivot doors 374, 375, 376 includes three pivot doors 374, 375, 376 arranged circumferentially between the adjacent struts 346, 347, 348, 349. In the illustrative embodiment, the first and second pivot doors 374, 375 are the same size, while the third pivot door 376 is sized to fill the space between the struts 346, 348, 349.

In the illustrative embodiment, the third pivot door 376 extends between the first strut 346 and the third strut 348 to fil the gaps therebetween. The third pivot door 376 therefore includes a cutout 377 as shown in FIG. 8. The cutout 377 is sized to receive the fourth strut 349 as the pivot door 376 changes from the stored arrangement to the thrust-reversing arrangement.

The present disclosure related to aircrafts 10 that support supersonic flight. The propulsion unit 12 for the aircraft 10 may include the exhaust system 16 that has an integral thrust reverser unit 30 and the ability to vary the variable nozzle throat area. The integrated thrust reverser unit 30 with the reconfigurable exhaust nozzle 24 may increase the efficiency of the propulsion unit 12.

The exhaust system 16 includes the static outer structure 26 and the noise management structure 28 with the translating plug 40 that together provide the reconfigurable exhaust nozzle 24. The reconfigurable exhaust nozzle 24 has a broad efficient peak across the operating range. The shape of the outer and inner boundary surfaces 34, 36 along with the variable nozzle throat area 38, provides efficient operation at cruise and quiet operation during take-off.

To control the variable nozzle throat area 38, the plug 40 is translated forward and aft to provide a large or maximum nozzle throat area 38A for take-off as shown in FIG. 3 and a minimum nozzle throat area 38B for cruise as shown in FIG. 4. The pivot doors 74, 76 of the thrust reverser unit 30 are integrated so that when the plug 40 is positioned for maximum nozzle throat area 38A or max A8, the pivot doors 74, 76 may be deployed to a thrust-reversing arrangement to close off aft engine flow and direct it forward thereby providing reverse thrust.

The maximum nozzle throat area 38A may be varied by supporting the vanes or struts 46, 48 and plug body 44 of the plug 40 on a track system. The track system or actuator unit 42 includes an actuator that moves the plug 40 forward and aft along the guide track 68. The guide rail 68 is anchored to the outer structure 26 so that the loads are transferred to the frame of the aircraft 10.

The actuator unit 42 is located at the outer end of the vane 46, 48 to take advantage of the cooler environment during operation of the engine 14. In the illustrative embodiment, the plug body 44 is supported by two vanes 46, 48 as shown in FIGS. 1-6.

In other embodiments, the plug body 244 is supported by three vanes 246, 247, 248 as shown in FIG. 7. In other embodiments, the plug body 44 is supported by four vanes 346, 347, 348, 349 as shown in FIG. 8. In some embodiments, the plug body 44 may only be supported by a single vane or strut.

This inner structure or plug 40 provides a physical variation in exhaust gas throat area and exit area that is controllable and repeatable. This variation may provide an environment for efficient engine operation. The shaping of the struts 46, 48, 246, 247, 248, 346, 347, 348, 349, the plug body 44, 244, 344, outer structure 26, 226, 326 provides a flow path 33 that maximizes performance at take-off, subsonic cruise and supersonic cruise. The thrust reverse unit 30 operates with the reconfigurable exhaust nozzle 24 and provides the capability to land the aircraft on short runways making the entire unit a highly integrated exhaust system 16.

The actuation units 42 utilize actuators 66 and a guide rail system 68 with bearings 70, 71, 72 located between the surface 34 and outer shroud 35 (cooler environment for hydraulic or electric actuators) for smooth, long life operation.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A propulsion unit for an aircraft, the unit comprising a gas turbine engine arranged along an axis including an engine core configured to discharge a core flow and a fan configured to be driven by the engine core to discharge a bypass flow, and
an exhaust system coupled to the gas turbine engine to receive mixed bypass and core flows from the gas turbine engine, the exhaust system including (i) a static outer structure arranged around the axis to provide an outer boundary surface of a primary exhaust system flow path, (ii) a noise management structure including a plug that defines an inner boundary surface of the primary exhaust system flow path that is mounted for movement along the axis, wherein the noise management structure is configured to axially translate relative to the static outer structure between a slid-forward take-off position, a slid-forward thrust-reverse position, and a slid-aft cruise position to provide a reconfigurable exhaust nozzle that adjusts a variable nozzle throat area of the exhaust system to vary noise produced by the gas turbine engine during operation of the gas turbine engine, and (iii) a thrust reverser unit including a plurality of pivot doors configured to pivot relative to the outer structure about a pivot axis between a stored arrangement in which the plurality of pivot doors engage the static outer structure to provide a portion of the outer boundary surface of the primary exhaust system flow path and a thrust-reversing arrangement in which each pivot door blocks at least some flow of the mixed bypass and core flows along the primary exhaust system flow path so as to direct the at least some flow of the mixed bypass and core flows out of the primary exhaust system flow path and create reverse thrust, wherein the plurality of pivot doors have an edge that has a corresponding shape to the inner boundary surface and engages the inner boundary surface when the plurality of pivot doors are in the thrust-reversing arrangement, wherein the plug includes a plug body that extends axially between a nose and a tail end and a plurality of struts that extend radially outward from the plug body to the static outer structure, wherein the noise management structure further includes a plurality of actuator units arranged to extend between and interconnect the plurality of struts and the static outer structure to change the plug between the slid-forward take-off position, the slid-forward thrust-reverse position, and the slid-aft cruise position.

2. The propulsion unit of claim 1, wherein the plurality of actuator units each include an actuator with a first end coupled to a radially outer end of a corresponding strut included in the plurality of struts and a second end coupled to the static outer structure, a guide track coupled to the static outer structure, and at least one carriage coupled to the radially outer end of the corresponding strut and mounted on the guide track to translate axially along the guide track, and wherein the actuator is configured to translate the at least one carriage axially along the guide track to change the plug between the slid-forward take-off position, the slid-forward thrust-reverse position, and the slid-aft cruise position.

3. The propulsion unit of claim 1, wherein the plurality of struts includes at least three struts spaced apart circumferentially about the axis and the plurality of pivot doors includes at least two pivot doors arranged circumferentially between adjacent struts of the plurality of struts.

4. The propulsion unit of claim 1, wherein the plurality of struts includes at least four struts spaced apart circumferentially about the axis and the plurality of pivot doors includes at least two pivot doors.

5. The propulsion unit of claim 1, wherein the slid-forward take-off position and the slid-forward thrust-reverse position are the same position along the axis.

6. The propulsion unit of claim 1, wherein the slid-forward take-off position of the plug provides a maximum nozzle throat area between the outer boundary surface of the static outer structure and the inner boundary surface of the plug.

7. The propulsion unit of claim 6, wherein the slid-aft cruise position of the plug provides a minimum nozzle throat area between the outer boundary surface of the static outer structure and the inner boundary surface of the plug that is less than the maximum nozzle throat area.

8. The propulsion unit of claim 7, wherein the plug is configured to translate axially between a plurality of positions between the slid-forward take-off position and the slid-aft cruise position.

9. An exhaust system for use with a gas turbine engine, the exhaust system comprising
a static outer structure arranged around an axis to provide an outer boundary surface of a primary exhaust system flow path of the exhaust system,
a noise management structure including a plug that defines an inner boundary surface of the primary exhaust system flow path that is mounted for movement along the axis, wherein the noise management structure is configured to axially translate relative to the static outer structure between a slid-forward take-off position, a slid-forward thrust-reverse position, and a slid-aft cruise position to provide a reconfigurable exhaust nozzle that adjusts a variable nozzle throat area of the exhaust system, and
a thrust reverser unit including a plurality of pivot doors configured to pivot relative to the outer structure about a pivot axis between a stored arrangement in which the plurality of pivot doors provide a portion of the outer boundary surface of the primary exhaust system flow path and an thrust-reversing arrangement in which each pivot door blocks at least some flow along the primary exhaust system flow path so as to direct the at least some flow out of the primary exhaust system flow path and create reverse thrust,
wherein the plurality of pivot doors have a corresponding shape to the inner boundary surface of the plug in the slid-forward thrust-reverse position at a location radially inward of the plurality of pivot doors when the plurality of pivot doors are in the thrust-reversing arrangement,
wherein the plug includes a plug body that extends axially between a nose and a tail end and a plurality of struts that extend radially outward from the plug body to the static outer structure,
wherein the noise management structure further includes a plurality of actuators arranged to extend between and interconnect the plurality of struts and the static outer structure to change the plug between the slid-forward take-off position, the slid-forward thrust-reverse position, and the slid-aft cruise position.

10. The exhaust system of claim 9, wherein the plurality of struts includes at least three struts spaced apart circumferentially about the axis and the plurality of pivot doors includes at least two pivot doors arranged circumferentially between adjacent struts of the plurality of struts.

11. The exhaust system of claim 9, wherein the plurality of struts includes at least four struts spaced apart circumferentially about the axis and the plurality of pivot doors includes at least two pivot doors.

12. The exhaust system of claim 9, wherein the slid-forward take-off position and the slid-forward thrust-reverse position are substantially the same position along the axis.

13. The exhaust system of claim 9, wherein the slid-forward take-off position of the plug provides a maximum nozzle throat area between the outer boundary surface of the static outer structure and the inner boundary surface of the plug.

14. The exhaust system of claim 13, wherein the slid-aft cruise position of the plug provides a minimum nozzle throat area between the outer boundary surface of the static outer structure and the inner boundary surface of the plug that is less than the maximum nozzle throat area.

15. An exhaust system for use with a gas turbine engine, the exhaust system comprising
a static outer structure arranged around an axis to provide an outer boundary surface of a primary exhaust system flow path of the exhaust system and an outer surface exposed to atmosphere around the static outer structure, the outer surface defining a first portion of an external boundary of the exhaust system, a noise management structure including a plug mounted for movement along the central axis, the plug having a plug body that extends between a nose and a tail end of the plug and that defines an inner boundary surface of the primary exhaust system flow path, wherein the noise management structure including the plug is configured to axially translate relative to the static outer structure between a slid-forward take-off position, a slid-forward thrust-reverse position, and a slid-aft cruise position to provide a reconfigurable exhaust nozzle that adjusts a variable nozzle throat area of the exhaust system, wherein the nose and tail end of the plug axially translate simultaneously as one body between the slid-forward take-off position, the slid-forward thrust-reverse position, and the slid-aft cruise position, and a thrust reverser unit including a plurality of pivot doors configured to pivot relative to the outer structure about a pivot axis between a stored arrangement in which the plurality of pivot doors provide a portion of the outer boundary surface of the primary exhaust system flow path and a second portion of the external boundary of the exhaust system and a thrust-reversing arrangement in which each pivot door rotates radially outward away from the outer boundary surface and blocks at least some flow along the primary exhaust system flow path so as to direct at least some flow out of the primary exhaust system flow path and create reverse thrust, wherein the plurality of pivot doors have a corresponding shape to the inner boundary surface of the plug in the slid-forward thrust-reverse position at a location radially inward of the plurality of pivot doors when the plurality of pivot doors are in the thrust-reversing arrangement, wherein the plug includes at least one strut that extends radially outward from the plug body to the static outer structure.

16. The exhaust system of claim 15, wherein the outer boundary surface and the inner boundary surface provide a convergent nozzle shape with a maximum nozzle throat area when the plug is in the slid-forward take-off position.

17. The exhaust system of claim 16, wherein the outer boundary surface and the inner boundary surface provide a convergent-divergent nozzle shape with a minimum nozzle throat area when the plug is in the slid-aft cruise position.

* * * * *